(12) United States Patent
Riedl et al.

(10) Patent No.: US 8,549,558 B2
(45) Date of Patent: Oct. 1, 2013

(54) SYSTEM AND METHOD FOR TARGETED ADVERTISEMENT DELIVERY

(76) Inventors: Steven Riedl, Superior, CO (US); Bryan Santangelo, Superior, CO (US); Gabriel M. Zimbelman, Arvada, CO (US)

( * ) Notice: Subject to any disclaimer, the term of this patent is extended or adjusted under 35 U.S.C. 154(b) by 550 days.

(21) Appl. No.: 11/495,157

(22) Filed: Jul. 28, 2006

(65) Prior Publication Data
US 2007/0204292 A1    Aug. 30, 2007

Related U.S. Application Data

(60) Provisional application No. 60/776,856, filed on Feb. 24, 2006.

(51) Int. Cl.
*H04N 7/10* (2006.01)

(52) U.S. Cl.
USPC ............... 725/35; 725/34; 725/36; 725/95

(58) Field of Classification Search
USPC .................................................. 725/35, 95
See application file for complete search history.

(56) References Cited

U.S. PATENT DOCUMENTS

| | | | |
|---|---|---|---|
| 6,938,268 B1* | 8/2005 | Hodge | 725/93 |
| 7,143,431 B1* | 11/2006 | Eager et al. | 725/101 |
| 8,099,757 B2* | 1/2012 | Riedl et al. | 725/116 |
| 2002/0059626 A1* | 5/2002 | Lemmons | 725/95 |
| 2002/0087976 A1* | 7/2002 | Kaplan et al. | 725/34 |
| 2002/0089995 A1* | 7/2002 | Shalvi et al. | 370/431 |
| 2003/0007499 A1* | 1/2003 | Rajahalme | 370/432 |
| 2003/0056217 A1* | 3/2003 | Brooks | 725/46 |
| 2003/0217365 A1* | 11/2003 | Caputo | 725/95 |
| 2004/0128682 A1* | 7/2004 | Liga et al. | 725/35 |
| 2004/0260619 A1* | 12/2004 | Cherkasova et al. | 705/26 |
| 2005/0204381 A1* | 9/2005 | Ludvig et al. | 725/34 |
| 2005/0259584 A1* | 11/2005 | Chen et al. | 370/238 |
| 2006/0107302 A1* | 5/2006 | Zdepski | 725/135 |
| 2006/0143649 A1* | 6/2006 | Laney et al. | 725/32 |
| 2010/0050218 A1* | 2/2010 | Carlucci et al. | 725/95 |

* cited by examiner

*Primary Examiner* — Vivek Srivastava
*Assistant Examiner* — Junior Mendoza
(74) *Attorney, Agent, or Firm* — Ostrow Kaufman LLP (57) ABSTRACT

The present invention is directed towards systems and methods for the delivery of programming content with targeted advertisements. One embodiment of a method according to the present invention comprises receiving a request for programming content from a given user, determining a given demographic group to which the given user belongs and determining whether the requested programming content is being streamed to one or more users associated with the given demographic group. If the requested programming content is being streamed to one or more users associated with the given demographic group, the requested programming content is streamed with advertisements targeted to the given demographic group to the given user. If not, a new stream is generated for the requested programming content with advertisements targeted to the given demographic group, which is streamed to the given user.

31 Claims, 5 Drawing Sheets

SYSTEM AND METHOD FOR TARGETED ADVERTISEMENT DELIVERY

The present application claims the benefit of U.S. Provisional Patent Application No. 60/776,856, entitled "SYSTEM AND METHOD FOR TARGETED ADVERTISEMENT DELIVERY," filed Feb. 24, 2006, the disclosure of which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

RELATED APPLICATIONS

The present application is related to the following commonly owned U.S. Patent Applications:

U.S. Patent Application Publication No. 2003/0056217, published Mar. 20, 2003, entitled "TECHNIQUE FOR EFFECTIVELY PROVIDING PROGRAM MATERIAL IN A CABLE TELEVISION SYSTEM;"

U.S. Patent Application Publication No. 2005/0039205, published Feb. 17, 2005, entitled "TECHNIQUE FOR EFFECTIVELY DELIVERING TARGETED ADVERTISEMENTS THROUGH A COMMUNICATIONS NETWORK HAVING LIMITED BANDWIDTH;" and U.S. patent application Ser. No. 11/186,452, filed Jul. 20, 2005, entitled "METHOD AND APPARATUS FOR BOUNDARY-BASED NETWORK OPERATION;" the disclosures of which are hereby incorporated by reference herein in their entirety.

FIELD OF THE INVENTION

The invention relates to communications systems and methods, and more particularly to a system and method for delivering programming content, along with alternate targeted advertisements, through a communications network, e.g., a cable TV network.

BACKGROUND OF THE INVENTION

In traditional cable networks, a broadcast stream containing program material, e.g., a TV show, typically contains one or more splice points (commonly referred to as advertisement breaks) allowing for the insertion of advertisements. Many cable operators utilize these splice points to insert local advertisements or for self-promotion. For example, a cable operator may broadcast an advertisement for a local car dealership at a splice point during the TV show "Friends." Although this form of advertising has been used for years, it is inefficient because in many instances the majority of subscribers watching the respective program material may not be a member of the audience for whom the advertisement is intended. For instance, in the example given above, many teenagers watch "Friends," but relatively few teenagers are potential purchasers of automobiles.

In response to this problem, an improved technique known as targeted advertising has been used recently in some cable networks. Targeted advertising generally allows a cable operator to generate one or more sets of "targeted advertisements" aimed at various demographic groups, and deliver the targeted advertisements to those groups. Several techniques exist for delivering targeted advertisements to subscribers' set-top terminals ("STTs") in a cable television network. According to one such technique, a cable operator's headend facility provides one or more sets of advertisements targeted at various demographic groups. Each STT in the network receives these targeted advertisements at opportune times, such as between 2:00 am and 6:00 am when the STT is not active, and stores them in memory. Subsequently, when subscribers are watching a cable program, the STT detects an upcoming advertisement break in the program and substitutes one or more of the targeted advertisements stored in memory for the regularly scheduled advertisements. The STT may use demographic information associated with the program currently being watched, or subscriber-related data collected by the STT, to select an appropriate substitute advertisement from among those stored in memory. In accordance with this technique, the targeted advertisements are inserted into the broadcast stream being received by the STT.

In accordance with another technique, a cable operator assigns, for a given program channel, a predetermined number of transmission channels to carry alternate targeted advertisements to the subscribers watching the given program channel. Using this technique, the cable operator prepares in advance a collection of targeted advertisements, without knowledge of the make-up of the actual audience of the given program channel at an advertisement break. To generate targeted advertisements, the cable operator utilizes a database containing demographic information describing the whole subscriber base.

Typically, multiple targeted advertisement streams are generated for various demographic groups identified within the subscriber base. When an advertisement break occurs, the cable operator transmits the prepared streams of targeted advertisements through the respective transmission channels. Each stream of targeted advertisements contains control information indicating the demographic group for which the advertisements are intended. An STT in the network selects one of the streams of targeted advertisements based on one or more factors. These factors may include a demographic profile associated with the TV show currently being shown, or information known about the respective STT household. The STT tunes to the appropriate transmission channel, plays the selected stream of targeted advertisements during the advertisement break, and then re-tunes to the original TV show channel after the advertising break ends. Another approach uses a dedicated stream for each subscriber. While this allows advertisements to be inserted personally for each set top device, it is extremely costly and consumes significant network resources, such as available bandwidth.

Existing techniques prove to be ineffective due to the bandwidth that such techniques require to play or download the multiple advertisements. The unicast approach is also ineffective due to the large number of different advertising steams that needs to be supported by the system to target every system user. For example, in a typical cable system, there are on the order of 650 service groups, each stream program content to about 120 users. Having to source 78,000 unicast streams each with different ads is not a reasonable with the current cable systems. Accordingly, there is a need for an improved targeted advertisement delivery system capable of being integrated into the modern cable network system for providing personalized advertising content to the cable network subscribers.

SUMMARY OF THE INVENTION

The present invention is premised upon the recognition that similar targeted advertisements may be spliced into the program channels streamed to the users in the same demographics, thereby eliminating the need to replicate substantially identical program channel streams for every user in the same demographic group and balancing personalized advertising content and system capacity. To that end, the disclosed cable network advertisement distribution system is operative to maintain a database of advertisement content targeted to different demographic groups of users. When a new user requests a program channel stream, the system determines the demographic group to which the given user belongs. The system then determines if the requested program channel stream with targeted ads spliced therein is already being broadcast to the demographic group to which the given user belongs. If such program stream is already being broadcasted, the new user is added to a multicast session for the given program channel stream.

The user therefore receives the requested program stream with the targeted ad spliced therein. If the requested program stream is not already being broadcast or the demographics of the new viewer don't match those of any existing multicast session, the system generates a new program channel stream and splices personalized ad therein, allowing the user to receive the requested program stream with the personalized, targeted ad spliced therein. The system may also consider the availability of advertisements for a new demographic group before deciding to create a new stream for the selected demographic. The system may also consider network capacity and cost/revenue as additional factors in the decision to add a new stream or join the user to an existing multicast. Embodiments of the invention may be implemented within a switched digital broadcast architecture and through the use of video on demand servers.

Embodiments of the invention are also directed towards systems and methods for transmitting an analog program stream that includes targeted advertisements to a client device. According to one embodiment, the method comprises receiving a request for a program stream from a given client device, identifying one or more demographics for a distribution hub with which the given client device is in communication and determining if a digital program stream that includes targeted advertisements is being transmitted to one or more demographics for the distribution hub. The digital program stream is converted to an analog program stream on the basis of the determination; and the analog program stream that includes targeted advertisements is transmitted to the client device.

Embodiments of the invention are further directed systems and methods for distributing advertisements on the basis of a value of a given advertisement. According to one embodiment, a method for transmitting an advertisement stream comprises receiving a request for a channel stream from a given client, the given client belonging to one or more demographic groups and transmitting the requested channel stream to the given client. Upon the occurrence of a spot break in the requested channel stream, one or more advertisement streams are identified, a given advertisement stream associated with one or more demographic groups. One or more of the advertisement steams are flagged as belonging to a given one of the one or more demographic groups to which the given client belongs and a given one of the one or more flagged advertisement streams with a greatest value is selected for transmission to the given client.

According to an alternative embodiment, a method for transmitting an advertisement stream comprises determining one or more features for an available spot in a program stream that is transmitted to a given client, the available spot associated with a value, and determining one or more advertisements with one or more features in common with the one or more features for the available spot. A given advertisement with a greatest value is selected for insertion into the program stream for transmission to the given client.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION OF THE INVENTION

The invention is directed to delivering program materials and targeted advertisements to subscribers through a broadband communications network, e.g., a switched digital broadcast cable TV network. The program materials transmitted over such a network may comprise one or more broadcast programs, e.g., TV shows, which typically are interrupted by advertisements. In this illustrative embodiment, streams containing the program materials of various program channels are transmitted through the network in accordance with a switched digital broadcast technique. One such switched broadcast technique is described, e.g., in Patent Application Publication No. 20030056217 published Mar. 20, 2003 and entitled "TECHNIQUE FOR EFFECTIVELY PROVIDING PROGRAM MATERIAL IN A CABLE TELEVISION SYSTEM", which is hereby incorporated by reference herein. As fully described below, using the switched broadcast technique, the cable TV network makes available to subscribers in the same service area selected program channels on an as needed basis. As a result, the number of program channels furnished here, although not simultaneously, may exceed the maximum number of carriers or transmission channels allowed in the network.

Figure 1:
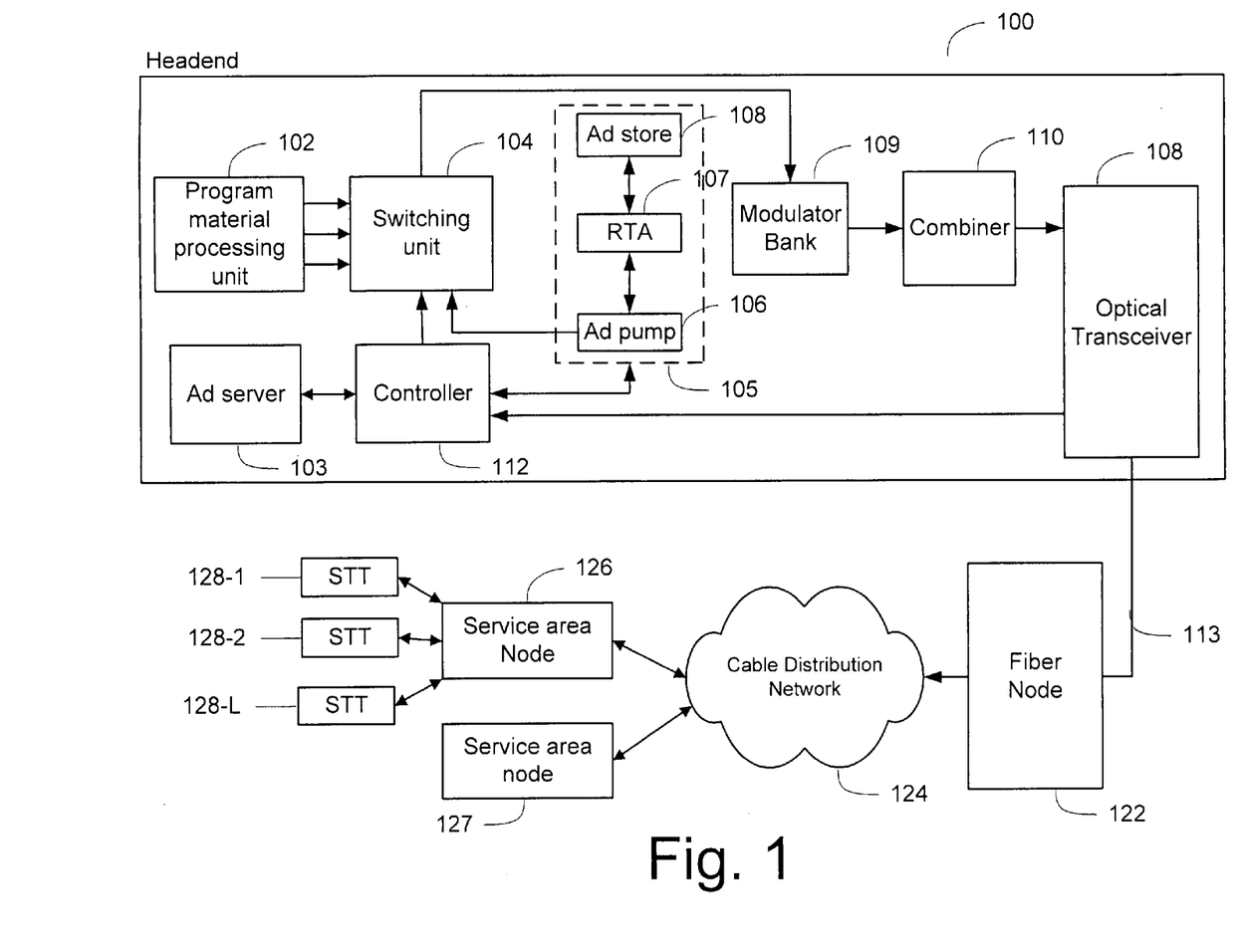
FIG. 1 is a block diagram presenting a switched digital broadcast cable TV system operative to provide targeted advertisements according to one embodiment of the present invention.

FIG. 1 illustrates a cable TV system embodying the principles of the invention for providing program materials to STTs at subscriber premises. As shown in FIG. 1, the cable TV system includes headend 100, fiber node 122, cable distribution network 124, and service area nodes 126, 127, etc. A service area node 126 is connected to STTs 128-1 through 128-L in a neighborhood or service area, where L represents an upper limit of STTs in a given service area.

At the headend 100, program material processing unit 102 receives program materials from various sources via satellites, terrestrial microwave transmissions, cable, etc. The program material processing unit 102 processes program materials to form one or more individual program channel streams in a digital format, e.g., the MPEG-2 format. A given program channel stream may contain program material, which requires a transmission channel having a specified frequency band for its distribution.

Switching unit 104, under control of controller 112, selectively switches a subset of one or more program channel streams, say, p program channel streams (where p≠total number of channel streams), from p output ports of video server 105 to input ports of modulator bank 109, respectively. The p program channel streams may be selected in a manner described below. According to one embodiment, the controller 112 selects the p output ports of video server 105 that correspond to the appropriate inputs of modulators in modulator bank 109. Accordingly, the p program channel streams maybe processed for targeted ad splicing in the manner discussed below and the ads may be spliced onto the one or more program channels for delivery to the users.

Video server 105 comprises a Real Time Acquisition unit 106 ("RTA"), ad pump 106, and ad store 108. According to one embodiment, the video server 105 may comprise a digital unicast server such as a Video On Demand (VOD) server. The RTA 107 is operative to process the p program channel streams to detect signals indicating that an advertisement break is imminent in the given channel stream and to direct the input feed to the Content Store 108. Such signals may include, e.g., cue messages placed in the program channel stream in accordance with industry standards. Upon detection of the cue message signal, the RTA 107 is operative to notify the controller 112 of the impending advertisement break. Upon the receipt of the notification from the RTA 107, the controller 112 notifies the ad server 103 of the upcoming ad break. In addition, the controller 112 provides the ad server 103 with information about the program channel stream on which the ad break is to occur, as well as the identifications of the STTs to which the program channel stream is currently being broadcasted.

The ad server 103 hosts a database of user profiles, which may include one or more items of user geographic or demographic information, as well as various user preferences. The demographic information may include, for example, user gender, ethnicity, profession, income, marital status, household information, etc. The user preferences may include user interests, hobbies, as well as specific user requests for particular types of advertisements. The ad server 103 determines one or more ads, which correspond to the user demographic information and/or preferences and forwards one or more ad identifiers to the controller 112 for splicing of the ads into the requested program channel steam.

According to one embodiment, the controller 112 determines whether the requested program channel stream spliced with ads targeted to the demographics to which the given user belongs is already being multicast to one or more users in the given demographic group. If such personalized program channel stream is already being multicast, the controller 112 adds the new user to a multicast session for the requested program channel stream, and the user receives the requested channel with ads targeted to the user demographic spliced therein. If the personalized program channel stream is not already being broadcast to the demographics group with which the user is associated, or the demographics group of the new user don't match those of any existing multicast session, the controller 112 assigns a channel for the new program channel stream. The controller 112 then requests ad server 103 to identify one or more ads targeted to the given user demographic group and forward the provided targeted ad identifiers to the video server 105, which may be a video on demand server.

Having received an ad request from the controller 112, the video server 105 retrieves the requested ads from ad store 108. The ad store 108 is a database of targeted ads, wherein each ad may comprise a file designated by the ad identifier, a relational database, an object-oriented database, a hybrid object-relational database, or other data store know to those of skill in the art. The ad store 108 returns the targeted ad to the ad pump 106, which forwards the targeted ads to the switch unit 104 to be spliced into the requested program channel stream.

Switching unit 104 feeds one or more personalized program channel streams with targeted ads from the video server 103 spliced therein to the corresponding inputs of modulators in modulator bank 106, for example, in accordance with a quadrature amplitude modulation (QAM) scheme. The modulators modulate the respective program channel streams onto different carriers corresponding to the modulators. The modulated carriers traverse transmission channels (also known as "in-band" channels) associated therewith, which according to one embodiment occupy a forward passband ranging from 50 MHz to 550 MHz of a coaxial cable.

Combiner 108 combines the modulated carriers to form a combined signal, which is fed to optical transceiver 110, generating an optical signal representing the combined signal. The optical signal traverses optical fiber 113 to fiber node 122. A transceiver (not shown) in fiber node 122 performs the inverse function to transceiver 110 by converting the optical signal back to the combined signal in electrical form. The combined signal traverses cable distribution network 124 to one or more service area nodes (e.g., 126, 127). At each service area node (e.g., 126), the combined signal is multicast to one or more STTs in a service area, e.g., STTs 128-1 through 128-L.

In this instance, each STT in the service area contains a service table, which associates the set of program channels with the carriers from which the respective program channel materials can be obtained. For example, in response to a change in the selected program channels, controller 112 sends control messages, e.g., via a forward data channel (FDC) described below, to revise the service table in the STTs to reflect the new assignment of carrier frequencies to the latest set of program channels. Thus, based on such a service table, an STT can extract a desired program channel stream from the aforementioned combined signal by tuning to the corresponding carrier frequency. The program material is then derived from the extracted stream for viewing by the user in a manner well known to those of skill in the art.

In addition to the in-band channels, downstream data, e.g., the aforementioned control messages and other system messages, may be communicated from headend 100 to STTs 128 via one or more FDCs, sometimes referred to as "out-of-band" channels. Such downstream data may be modulated by modem 130, e.g., in accordance with a quaternary phase shift keying (QPSK) scheme onto the FDCs, which may occupy the 70-130 MHz band of a coaxial cable.

Upstream data, communicated from STTs 128 to headend 100, may be modulated by a cable modem in an STT onto one or more reverse data channels ("RDCs"). In accordance with the switched broadcast technique, the STTs utilize the RDCs to inform controller 112 of a subscriber's program channel change event. For example, when a subscriber at an STT selects a different program channel to watch, a program channel change message is sent from the STT to controller 112. It should be noted at this point that each of set-top terminals 128-1 through 128-L is pre-assigned with an identifier for identifying the STT. In this instance, a media access control (MAC) address of the STT is used for such identification. Alternatively, an Internet protocol (IP) address of the STT may be used.

Figure 2:
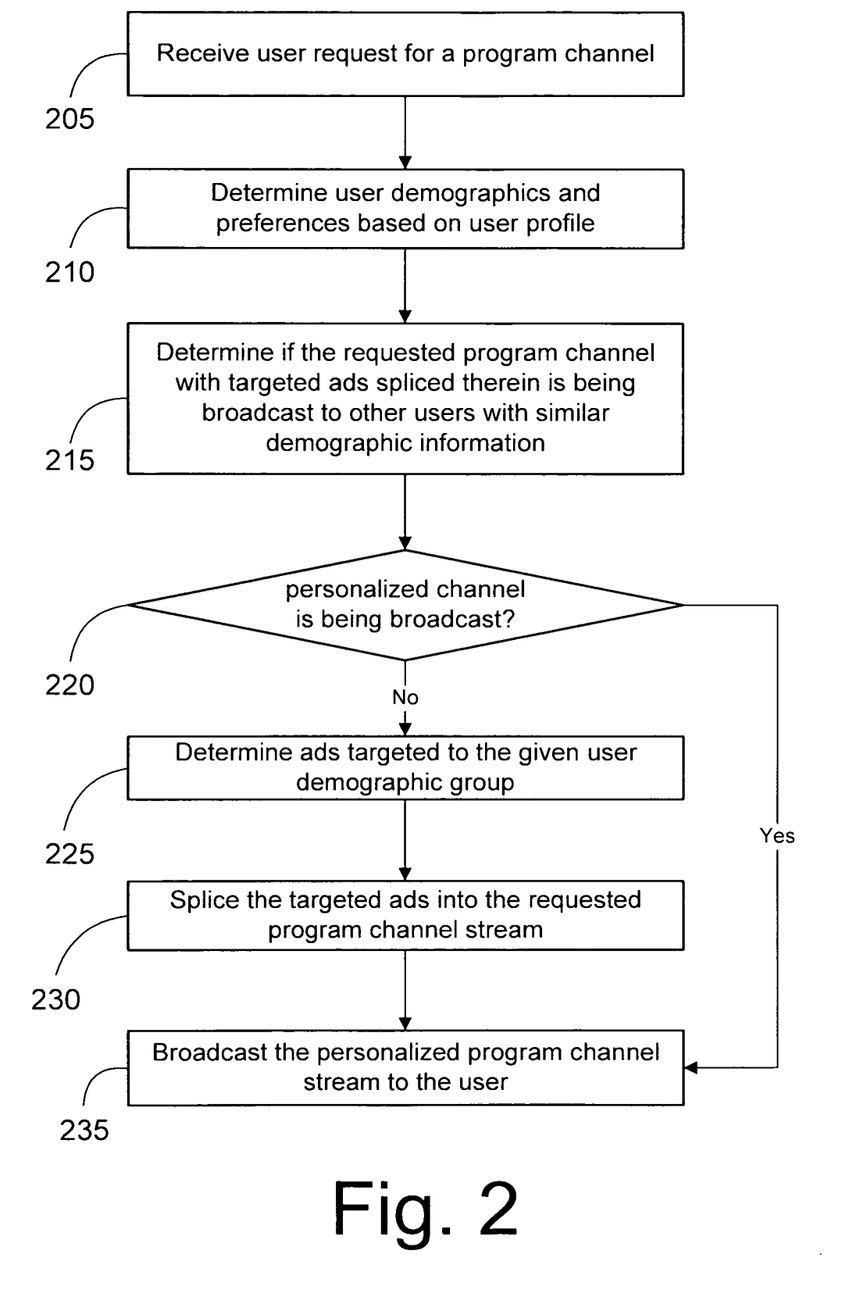
FIG. 2 is a flow diagram illustrating a process for providing targeted advertisement to the user according to one embodiment of the present invention.

FIG. 2 is a flow diagram illustrating a process for providing targeted advertisement to the user in accordance with one embodiment of the present invention. A controller at the headend of the cable TV system receives a request for a program channel stream from a STT, step 205. The controller resolves the MAC address of the STT posting the request and forwards this information to the ad server. The ad server uses the provided information to retrieve user profile associated with the user of the given STT, step 210. According to one embodiment, the user profile includes, but is not limited to, user demographics information and various user preferences. The demographic information may include, for example, user gender, ethnicity, profession, income, marital status, household information, etc. The user preferences may include user interests, hobbies, as well as specific user requests for particular types of advertisements. The ad server then queries the controller as to whether the requested program channel stream is being broadcast to the one or more users having similar demographic information, step 215.

If such personalized program channel stream is already being broadcast to other users, step 220, the controller adds the new user to a multicast session for the requested program channel stream, and the user receives the requested channel with ads targeted to the user demographic spliced therein, step 235. If the personalized program channel stream is not already being broadcast to the demographics group with which the user is associated, or the demographics group of the new user doesn't match those of any existing multicast session, the controller assigns a channel for the new program channel stream and requests ad server to determine one or more ads targeted to the demographic group of the given user. The ad server determines which ads are targeted to the demographic group of the given user and returns the requested ad identifiers to the controller, 225. Having received targeted ad identifiers from the ad server, the controller requests video server to retrieve these ads from the ad data store. The retrieved ads are pumped into the switching unit and spliced into the requested program channel stream for transmission to the user, step 235.

Figure 3:
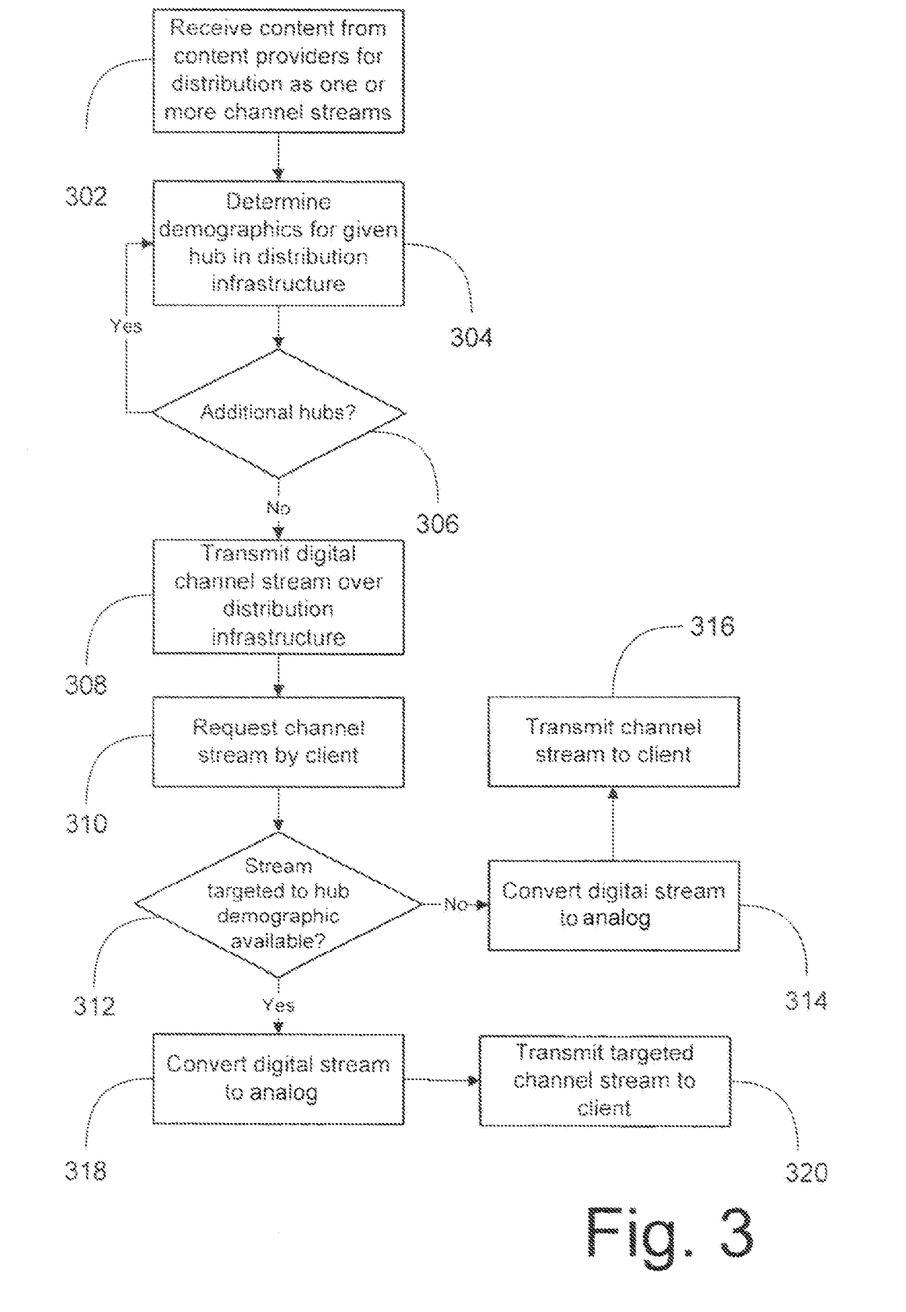
FIG. 3 is a flow diagram illustrating a process for utilizing a switched digital broadcast TV system to provide targeted advertisements in a unidirectional broadcast distribution network according to one embodiment of the present invention.

FIG. 3 presents one embodiment of a method for utilizing the switched digital advertisement targeting techniques and infrastructure described herein for the delivery of targeted advertisements in a unidirectional broadcast distribution network. According to the method of FIG. 3, a headend of a switched digital broadcast distribution system receives content, both digital and analog, from one or more content providers for distribution as one or more channel streams, step 302.

Because some devices receiving channel streams in the distribution network are analog or only capable of unidirectional communication (e.g., capable of receiving content by lacking a return communication channel), the distribution system is unable to switch channel streams being transmitted to these devices. Accordingly, instead of determining the demographics and preferences for a given user, a determination is made regarding the demographics for a given hub in the distribution system, step 304. According to one embodiment, the system determines aggregate demographics and preferences for users with client devices attached to the distribution system. Alternatively, the basis of demographic and preference information may be made on the basis of a subset of the users. A check is performed to determine if additional hubs exist in the distribution system that require the determination of demographics and preferences, step 306.

One or more channel streams are transmitted over the switched digital broadcast infrastructure for viewing by one or more clients, step 308. According to one embodiment, the distribution infrastructure comprises a fiber loop that utilizes gigabit Ethernet to connect the headend to one or more hubs for distribution to client devices that are communicatively coupled to a given one of the one or more hubs. A user of a client device my issue a command to receive a given channel stream from the channel streams that are available on the switched digital broadcast infrastructure, step 310, and a check is performed to determine if a channel stream is available that is targeted to the hub demographic, step 312. Where a channel stream targeted to the hub demographic is not available, an untargeted channel stream is retrieved and converted to analog, step 314, for transmission to the requesting client, step 316. Alternatively, the system may generate a new channel stream that it targets to the hub demographic for transmission to the client device. Where a channel stream targeted to the hub demographic is available, step 312, the channel stream is converted to analog, step 318, for transmission to the requesting client, step 320. It should be understood by those of skill in the art that the analog conversion step is only necessary when transmitting the channel stream to an analog device.

Figure 4:
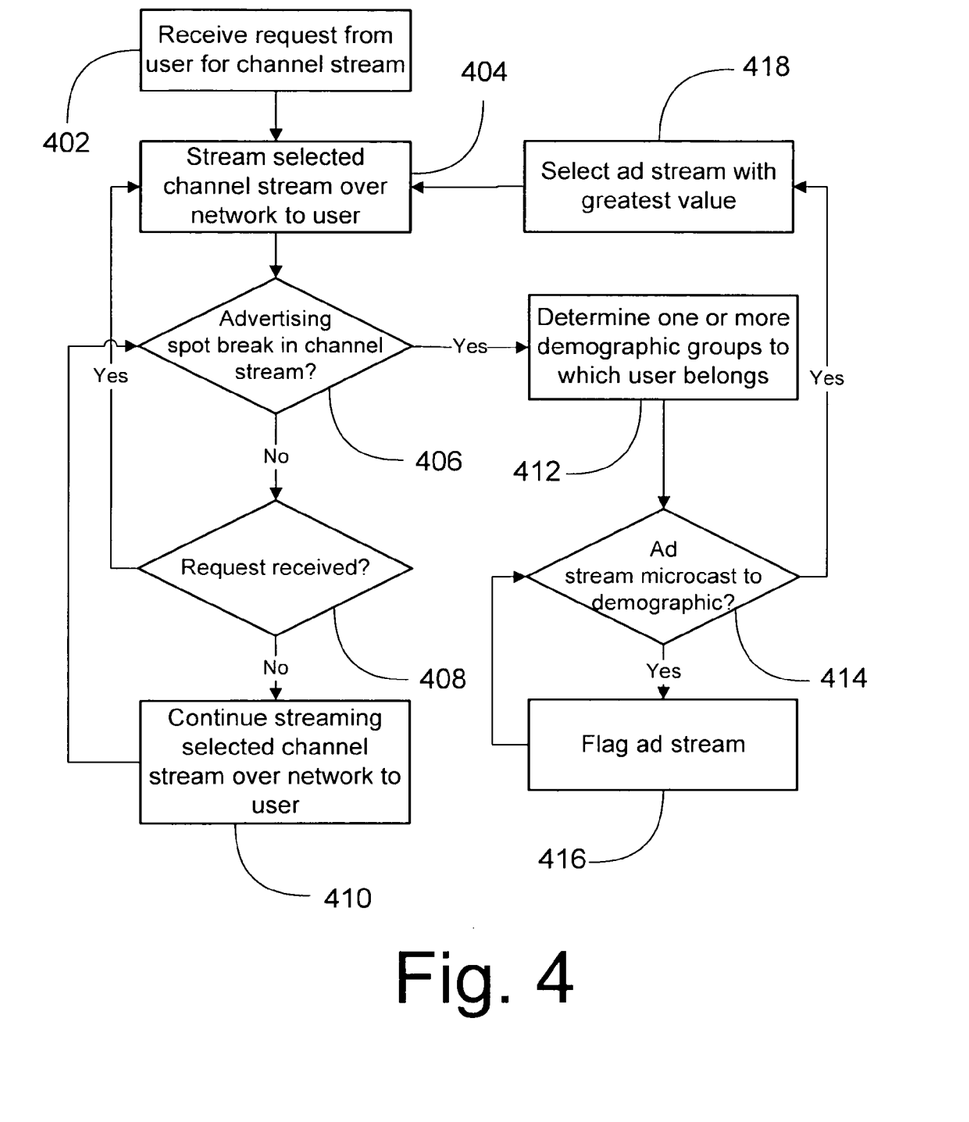
FIG. 4 is a flow diagram illustrating a process for value maximization in a switched digital TV system according to one embodiment of the present invention.

FIG. 4 is a flow diagram illustrating a process for value maximization in a switched digital TV system according to one embodiment of the present invention. According to the embodiment illustrated at FIG. 4, the headend receives a request from a user for a given channel stream, step 402. For example, when the user submits a change channel request by pressing a corresponding key on a remote control or by directly tuning to a given channel that the headend is making available. The headend streams the selected channel stream over the transmission network to the user in response to the request, step 404. According to embodiments discussed herein, the headend determines whether it is currently streaming the channel stream that the user is requesting to other users in the user's demographic group. Where the headend is currently streaming to the demographic group, an address of a client device that the user is utilizing may be added to a set of multicast recipients receiving the stream. If no streams are being streamed to the user's demographic group, the headend generates a new stream for transmission to the user.

While the channel stream that the user requests is streaming to the user's client device, step 404, a check is performed to determine is an advertising spot break is present in the channel stream, step 406. For example, the check may determine if an advertisement cue signal is present in the channel stream indicating the presence of an available spot for the insertion of an advertisement. According to one embodiment, the check may be performed in advance of reaching the cue position in the channel stream, e.g., by scanning ahead in the channel stream or through an out of band signaling mechanism that indicates the location of a given available advertisement spot in the channel stream. Where there is no upcoming advertisement spot, step 406, a check is performed to determine if there has been a receipt of a subsequent channel stream request, step 408. Where the user tunes to a new channel, resulting in a subsequent channel stream request, the headend streams the channel stream that the user requests, step 404. If there is not available advertisement spot in the channel stream and the user has not requested a subsequent channel stream, steps 406 and 408, the headend continues to stream the selected channel stream over the network to the user, step 410.

Where an advertisement spot is present in the channel stream that the headend is streaming to the user, step 406, flow continues with step 412 where a determination is made regarding the one or more demographic groups to which the user belongs. Because the user may belong to one or more demographic groups, combinations of demographic groups to which the user belongs may be determined. A check is performed to determine if an advertisement stream (or one or more advertisements) is streaming to other users that belong to a given demographic group to which the user belongs, step 414. Where an advertisement stream is streaming to a given demographic to which the user belongs, the advertisement stream is flagged, step 416. According to one embodiment, only those advertisement streams for the channel stream that the user is receiving are checked to determine if a given advertisement stream is streaming to demographic group to which the user belongs. For example, where the user is watching a given program and the user belongs to a first, second and third demographic group, the headend flags advertisement streams that it is delivering to users who belong to the first, second and third demographic groups, as well as combinations thereof.

When the check performed at step 414 evaluates to false, the method has produced a set of one or more advertisement streams, which may include one or more individual advertisements, streaming to demographic groups to which the user belongs. Because the user has at least one demographic feature in common with the users who are receiving the advertisement streams in the set of advertisement streams, the headend may select any of the advertisement streams to provide an advertisement that is targeted to the user. Accordingly, the distribution system of the present invention may select the advertisement stream form the set of advertisement streams that yields the greatest value, step 418. The headend selects the advertisement or advertisement stream with the greatest value, which may splice into the channel feed for streaming to the user, step 404.

Figure 5:
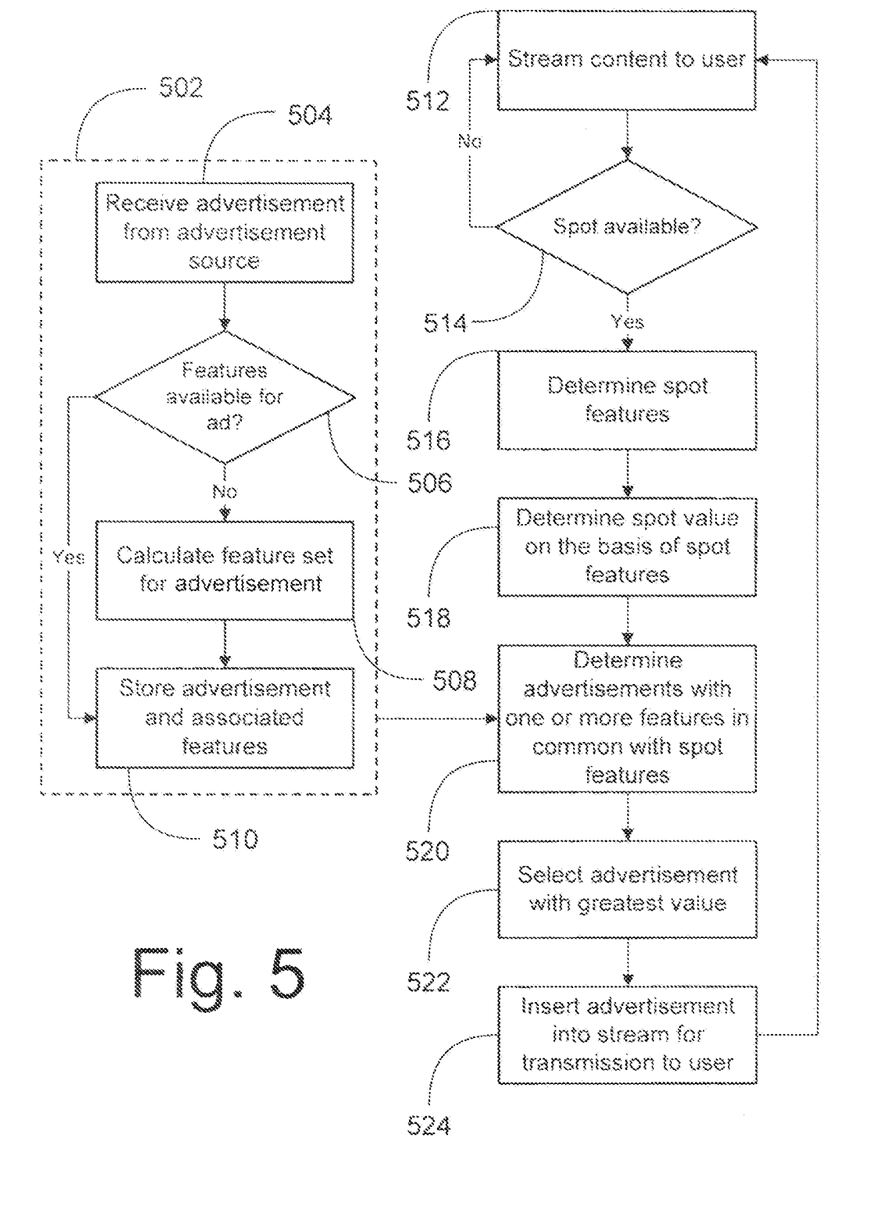
FIG. 5 is a flow diagram illustrating a process for determining spot value in a switched digital TV system according to one embodiment of the present invention.

FIG. 5 is a flow diagram illustrating a process for determining spot value in a switched digital TV system according to one embodiment of the present invention. According to the embodiment of FIG. 5, components at the headend execute an offline process 501 for the receipt and pre-processing of advertisements. It should be noted by those of skill in the art that the offline advertisement and receipt process 502 may be executed in parallel in real time with other steps of the method of the present embodiment.

Advertisement receipt and processing initiates with the receipt of an advertisement from an advertisement source, step 504. A check is performed to determine if advertisement features are available for the received advertisement, step 506. Features for a given advertisement may be dependent or independent. For example, a dependent feature may comprise a corporate entity sponsoring the advertisement, the product or service that the advertisement concerns, metadata describing the advertisement, one or more demographic groups to which the advertiser is targeting the advertisement, etc. Independent features may comprise a channel on which or program during which the advertiser wishes to display the advertisement, time of day or day of week during which the advertiser wishes to display the advertisement, etc.

Where the advertiser does not provide one or more features for the advertisement, a feature set may be calculated for the advertisement, step 508. For example, the system may utilize features from other advertisements from the same advertiser, or from other advertisements from the same producer of goods or services as to which the advertisement is directed towards. Similarly, the system may utilize features from advertisements from other advertisers or producers of goods or services, such as where a given advertisement is directed towards toothpaste, the system may utilize features from advertisements for toothpaste from other advertisers or manufacturers of toothpaste. The feature set is calculated, step 508 or made available from an advertisement source, step 506, and the advertisement and associated features are stored for later retrieval and processing, step 510, such as on a persistent storage device.

The process continues, either in parallel with process 502 or subsequent thereto, with user receiving a channel stream of content, e.g., a television program, step 512. A check is performed to determine if an advertising spot is available in the channel stream for the insertion of a targeted advertisement, step 514. Where a spot is not available, processing returns to step 512 with the headend continuing to transmit the channel stream to the user. When the system determines that a spot is available in the channel stream, which may comprise an upcoming spot in the channel stream, a determination is made as to the features that comprise the spot, step 514, including, but not limited to, the channel on which is the spot is available, the program that is presently streaming, time and data information, demographic information regarding the user, etc. A value is determined for the spot on the basis of the features of the spot, step 518.

The features of the spot are used to determine one or more advertisements with one or more features in common with the features of the spot, step 520. According to one embodiment, the system selects advertisements that comprise a number of features in common with the spot in excess of a threshold. For example, a threshold may be set at four features such that advertisements with four or more features in common with the features comprising the spot are selected for potential inclusion in the channel feed that the user is receiving. The threshold may be set or adjusted in real-time according to system parameters, e.g., time of day whereby a differing numbers of common features are necessary for selection of an advisement at a given point of the day or week.

The system determines one or more potential advertisements for transmission and presentation to the user, step 520, and selects an advertisement that comprises the greatest value. According to one embodiment, the system executes a bidding marketplace whereby advertisers bid on the display of advertisements in response to spots with one or more given features. Accordingly, the system selects an advertisement with a greatest bid for the spot as determined by the features of the spot, step 522. The selected advertisement is inserted into the channel stream for transmission to the user, step 524. Upon conclusion of streaming the selected advertisement to the user, processing continues with transmission of the channel feed to the user until the availability of a subsequent spot, steps 512 and 514.

The foregoing description, for purposes of explanation, uses specific nomenclature and formula to provide a thorough understanding of the invention. It should be apparent to those of skill in the art that the specific details are not required in order to practice the invention. The embodiment have been chosen and described to best explain the principles of the invention and its practical application, thereby enabling others of skill in the art to utilize the invention and various embodiments with various modifications as are suited to the particular use contemplated. Thus, the foregoing disclosure is not intended to be exhaustive or to limit the invention to the precise forms disclosed and those of skill in the art recognize that many modifications and variations are possible in view of the above teachings.

What is claimed is:

1. A method for delivery of programming content with targeted advertisements over a communication network, the method comprising:

receiving a request for programming content from a plurality of users over a communication network, including at least a first user, a second user, and a third user, the request comprising a selection of a channel in a television system, the system operable to multicast the programming content on the selected channel to the plurality of users in at least a first channel stream to users belonging to a first demographic group and a second channel stream to users belonging to a second demographic group, the multicast programming in each of the at least first and second channel streams comprising the content requested and an advertisement targeted to a respective one of the demographic groups streamed in a single stream to multicast recipients, the targeted advertisement spliced into the content requested in response to the request for programming content from an initial user of each of the demographic groups;

determining whether the plurality of users belong to at least one of the first and the second demographic groups to which the requested programming content is being streamed;

determining that at least the first user belongs to at least one of the first and second demographic groups to which the requested programming content is being streamed, adding the first user to a set of one of the first and the second demographic group multicast recipients in response to the request for programming content from the first user and streaming to the first user one of the first channel stream and the second channel stream comprising the requested programming content previously spliced with advertisements targeted to the respective demographic group of the first user;

determining that at least the second user does not belong to an existing demographic group to which the requested programming content is being streamed, determining a first new demographic group to which the second user belongs, determining at least one factor comprising a monetary cost and an advertising revenue associated with generating a new channel stream for the first new demographic group, generating conditionally a first new channel stream for the requested programming content based on the at least one factor in response to the request for programming content from the second user, wherein the first new channel stream comprises advertisements targeted to the first new demographic group spliced into the requested programming content in response to the request for programming content from the second user, and streaming the first new channel stream to the second user upon determining to generate the first new channel stream; and determining that at least the third user does not belong to an existing demographic group to which the requested programming content is being streamed, determining a second new demographic group to which the third user belongs, determining a monetary cost and an advertising revenue associated with generating a second new channel stream for the second new demographic group, deciding not to generate the second new channel stream for the requested programming content based on the monetary cost and the advertising revenue associated with generating a second new channel stream for the second new demographic group, determining an existing demographic group similar to the second new demographic group, and streaming to the third user the channel stream associated with the existing demographic group.

2. The method of claim 1, wherein receiving comprises receiving over a switched digital cable TV network.

3. The method of claim 1, wherein receiving comprises receiving a request for program content selected from the set of program content including one or more of a cable TV channel, a broadcast channel and a video-on-demand (VOD) program.

4. The method of claim 1, wherein determining a demographic group comprises comparing one or more demographic characteristics of a given user to the demographic characteristics of users associated with one or more demographic groups.

5. The method of claim 4, wherein comparing the one or more demographic characteristics comprises selecting one or more demographic characteristics from the group of demographic characteristics including gender, age, ethnicity, geographic location of the residence, marital status, education, income, interests and user-specified preferences.

6. The method of claim 1 comprising targeting an advertisement to the given demographic group based on one or more demographic characteristics of users associated with the given demographic group.

7. The method of claim 6 comprising selecting one or more demographic characteristics from the group of demographic characteristics including gender, age, ethnicity, geographic location of the residence, marital status, education, income, interests and user-specified preferences.

8. The method of claim 1 wherein generating the new stream for the requested programming content comprises checking for available advertisements for the new demographic group, and generating the new channel stream based on availability of advertisements for the new demographic group.

9. The method of claim 8 comprising, for at least the third user, determining that the third user does not belong to an existing demographic group and deciding not to generate a new channel stream upon determining that advertisements are not available for a new demographic group to which the third user belongs.

10. The method of claim 1 wherein generating a new stream for the requested programming content further comprises checking for available bandwidth for transmission of the new stream.

11. The method of claim 10 comprising, for at least the third user, determining that the third user does not belong to an existing demographic group and deciding not to generate a new channel stream upon determining that bandwidth is not available for the transmission of a new stream.

12. A method for delivery of programming content with targeted advertisements over a communication network, the method comprising:

receiving a request for programming content a plurality of users over a communication network, including at least a first user and a second user, the request comprising a selection of a channel in a television system, the system operable to multicast the programming content on the selected channel to a the plurality of users in at least a first channel stream to users belonging to a first demographic group and a second channel stream to users belonging to a second demographic group, the multicast programming in each of the at least first and second channel streams comprising the content requested and an advertisement targeted to a respective one of the demographic groups streamed in a single stream to multicast recipients, the targeted advertisement spliced into the content requested in response to the request for programming content from an initial user of each of the demographic groups;

determining whether the plurality of users belong to at least one of the first and the second demographic groups to which the requested programming content is being streamed;

determining that at least the first user belongs to at least one of the first and second demographic groups to which the requested programming content is being streamed, adding the first user to a set of one of the first and the second demographic group multicast recipients in response to the request for programming content from the first user and streaming to the first user one of the first channel stream and the second channel stream comprising the requested programming content to the first user;

determining that at least the second user does not belong to an existing demographic group to which the requested programming content is being streamed, determining a monetary cost and an advertising revenue associated with generating a new channel stream for the new demographic group, determining a new demographic group to which second user belongs, determining whether to generate conditionally a new channel stream for the requested programming content based on the monetary cost and the advertising revenue associated with generating a second new channel stream for the second new demographic group in response to the request for programming content from the second user, and streaming the requested programming content to the second user upon determining to generate the new stream to the second user; and splicing one or more advertisements targeted to the second user demographic group into the requested programming content streamed to the second user, wherein the requested programming content and the one or more advertisements targeted to the second demographic group are streamed to the second user in a single stream.

13. The method of claim 12, wherein receiving a request comprises receiving over a switched digital cable TV network.

14. The method of claim 12, wherein receiving comprises receiving a request for programming content selected from the set of program content including one or more of a cable TV channel, a broadcast channel and a video-on-demand (VOD) program.

15. The method of claim 12, wherein determining a demographic group comprises comparing one or more demographic characteristics of a given user to the demographic characteristics of users associated with one or more demographic groups.

16. The method of claim 15, wherein comparing the one or more demographic characteristics comprises selecting one or more demographic characteristics from the group of demographic characteristics including gender, age, ethnicity, geographic location of the residence, marital status, education, income, interests and user-specified preferences.

17. The method of claim 12 comprising targeting an advertisement to the given demographic group based on one or more demographic characteristics of the users associated with the given demographic group.

18. The method of claim 17 comprising selecting the one or more demographic characteristics from the group of demographic characteristics including gender, age, ethnicity, geographic location of the residence, marital status, education, income, interests and user-specified preferences.

19. The method of claim 18 comprising, for at least a third user, determining that the third user does not belong to an existing demographic group and deciding not to generate a new channel stream upon determining that advertisements are not available for a new demographic group to which the third user belongs.

20. The method of claim 19 comprising streaming the requested programming content with advertisements targeted to a demographic group that is similar to the demographic group of the third user.

21. The method of claim 12 wherein generating the new stream for the requested programming content comprises checking for available advertisements for the new demographic group, and generating the new channel stream based on availability of advertisements for the new demographic group.

22. The method of claim 12 wherein generating the new stream for the requested programming content further comprises checking for available bandwidth for transmission of the new stream.

23. The method of claim 22 comprising not generating the new stream where the check determines that bandwidth is not available for the transmission of the new stream.

24. The method of claim 23 comprising streaming the requested programming content with advertisements targeted to a demographic group that is similar to the given demographic group of the user.

25. A system for delivery of programming content with targeted advertisements over a communication network, the system comprising:

a content server operative to provide programming content to a plurality of users upon receipt of a request over the communication network, the request comprising a selection of a channel in a television system, the system operable to multicast the programming content on the selected channel to a the plurality of users in at least a first channel stream to users belonging to a first demographic group and a second channel stream to users belonging to a second demographic group, the multicast programming in each of the at least first and second channel streams comprising the content requested and an advertisement targeted to a respective one of the demographic groups streamed in a single stream to multicast recipients, the targeted advertisement spliced into the content requested in response to the request for programming content from an initial user of each of the demographic groups;

an advertisement server operative to provide one or more advertisements targeted to one or more demographic groups of users;

a control processor operative to (i) determine whether the plurality of users belong to at least one of the first and the second demographic groups to which the requested programming content is being streamed, (ii) stream one of the first channel stream and the second channel stream from the content server to a first user if the first user belongs to at least one of the first and second demographic groups to which the requested programming content is being streamed, and (iii) determine that at least a second user does not belong to an existing demographic groups to which the requested programming content is being streamed and a monetary cost and an advertising revenue associated with generating a new channel stream for the new demographic group, request a new stream of the requested programming content from the content server and stream the requested programming content to the given user if the second user does not belong to at least one of the first and second demographic groups to which the requested programming content is being streamed based on the monetary cost and the advertising revenue associated with generating a second new channel stream for the second new demographic group in response to the request for programming content from the second user; and a splicer operative upon request from the control processor to (i) retrieve from the advertisement server one or more advertisements targeted to the new demographic group and (ii) splice the retrieved targeted advertisements into the requested programming content streamed to the second user, wherein the requested programming content and the retrieved targeted advertisements are streamed to the second user in a single stream.

26. The system of claim 25, wherein the communication network comprises a switched digital cable TV network.

27. The system of claim 25, wherein the programming content comprises programming content selected from the set of programming content including one or more of a cable TV channel, a broadcast channel and a video-on-demand (VOD) program.

28. The system of claim 25, wherein the advertisement server is operative to determine a demographic group by executing a comparison between one or more demographic characteristics of a given user and the demographic characteristics of users associated with the one or more demographic groups.

29. The system of claim 28, wherein the one or more demographic characteristics are selected from the group of demographic characteristics including gender, age, ethnicity, geographic location of the residence, marital status, education, income, interests and user-specified preferences.

30. The system of claim 25, wherein the advertisement server is operative to target a given advertisement to the given demographic group on the basis of on one or more demographic characteristics of the users associated with the given demographic group.

31. The system of claim 30, wherein the one or more demographic characteristics are selected from the group of demographic characteristics including gender, age, ethnicity, geographic location of the residence, marital status, education, income, interests and user-specified preferences.

* * * * *